(12) United States Patent
Sasaki

(10) Patent No.: US 8,826,956 B2
(45) Date of Patent: Sep. 9, 2014

(54) PNEUMATIC TIRE

(75) Inventor: Akira Sasaki, Tokyo (JP)

(73) Assignee: Bridgestone Corporation, Tokyo (JP)

(*) Notice: Subject to any disclaimer, the term of this patent is extended or adjusted under 35 U.S.C. 154(b) by 21 days.

(21) Appl. No.: 13/462,426

(22) Filed: May 2, 2012

(65) Prior Publication Data

US 2012/0211141 A1 Aug. 23, 2012

Related U.S. Application Data

(62) Division of application No. 12/527,099, filed as application No. PCT/JP2008/052052 on Feb. 7, 2008, now Pat. No. 8,528,614.

(30) Foreign Application Priority Data

Feb. 15, 2007 (JP) .................................. 2007-035336

(51) Int. Cl.
*B60C 15/00* (2006.01)
*B60C 15/06* (2006.01)

(52) U.S. Cl.
CPC ...................................... *B60C 15/06* (2013.01)
USPC ............ 152/543; 152/539; 152/540; 152/547

(58) Field of Classification Search
USPC .................................................. 152/539–547
IPC ....................................................... B60C 15/06
See application file for complete search history.

(56) References Cited

U.S. PATENT DOCUMENTS 5,772,811 A 6/1998 Ueyoko et al.
6,044,885 A * 4/2000 Kato ............................. 152/540
6,135,182 A * 10/2000 Nagai ........................... 152/458
6,354,351 B1 * 3/2002 Miyazono ..................... 152/543
6,460,589 B1 * 10/2002 Auxerre ........................ 152/540

FOREIGN PATENT DOCUMENTS

| EP | 1 066 992 A2 | 1/2001 |
|---|---|---|
| FR | 2055988 | 5/1971 |
| JP | 9-193625 A | 7/1997 |
| JP | 10-329514 A | 12/1998 |

(Continued)

OTHER PUBLICATIONS

Machine Translation: Fukazawa, S; Japan; JP2006-175955A; (No date).*

(Continued)

*Primary Examiner* — Richard Crispino
*Assistant Examiner* — Kendra Shin
(74) *Attorney, Agent, or Firm* — Sughrue Mion, PLLC

(57) ABSTRACT

A pneumatic tire having a pair of bead portions; bead cores each having a polygonal cross section; a radial carcass having respective ends wound around the corresponding bead cores from the inner to outer side; one layer of wire chafer disposed outwardly of the radial carcass relative to the bead core; and a rubber chafer in a contact area between the bead portion and a prescribed rim, wherein, in a cross section of the tire assembled with the prescribed rim, the angle between the bottom side of the bead core and a bead seat of the prescribed rim is in the range of 0±2°, and a portion, on the tire outer surface side, of an outermost layer filament of steel cords constituting the wire chafer extends at an angle in the range of 90±5° relative to the extending direction of ply cords of the radial carcass.

5 Claims, 3 Drawing Sheets

(56) References Cited

FOREIGN PATENT DOCUMENTS

| JP | 2006-021588 A | | 1/2006 | |
|----|---------------|---|--------|---|
| JP | 2006-027516 A | | 2/2006 | |
| JP | 2006-188147 A | | 7/2006 | |
| JP | 2006175955 A | * | 7/2006 | ............ B60C 15/06 |
| JP | 2007045353 A | * | 2/2007 | ............ B60C 15/06 |
| WO | 2007/015341 A1 | | 2/2007 | |

OTHER PUBLICATIONS

Machine Translation: JP2007-045353; Okane, Takashi; (No Date).*
Supplementary European Search Report issued in Euorpean Application No. 08710931.0-2425/2123488 dated Sep. 6, 2010 (7 pages).
Japanese Office Action issued in Japanese Application No. 2007-035336 dated Dec. 13, 2011 with English translation (4 pages).
International Search Report for PCT/JP2008/052052, mailed Apr. 1, 2008.

* cited by examiner

A case where a spiral filament 15a is not provided on each steel cord

Extending direction of outermost peripheral filament 15b

Extending direction of ply cord of radial carcass

PNEUMATIC TIRE

CROSS-REFERENCE TO RELATED APPLICATION

This application is a divisional of U.S. application Ser. No. 12/527,099, filed Aug. 13, 2009, the entire content of which is incorporated herein by reference.

TECHNICAL FIELD

The present invention relates to a pneumatic tire, in particular, a pneumatic radial tire for heavy load suitable for use in a construction vehicle. The present invention especially proposes a technique for improving anti-slip properties of a rim in a tire bead portion and also improving separation resistance properties of a wire chafer in the bead portion to significantly enhance durability of the bead portion,

PRIOR ART

It is known that a conventional pneumatic radial tire of this type often suffers from separation of a wire chafer in a bead portion. Such separation as this occurs because a rubber substance of a bead base portion makes runaway deformation from the center position in the widthwise direction of a bead core toward the heal side and the toe side, respectively, when a tire is rotated with a load applied thereon. Due to this separation of a wire chafer, contact reaction force between the bead base and a bead seat of a rim is dissipated, whereby rim slip may occur if a sufficient contact pressure is not ensured between the rim and the bead base.

In order to prevent such separation in a bead portion from occurring and enhance durability of the bead portion, there have conventionally been made improvements, as disclosed in JP 2006-021588, mainly in structural components other than a wire chafer, such as bead core inner diameter, ring shape, hardness of a rubber chafer, a deformation absorbing layer and the like, so that shear strain in coating rubber of the wire chafer is reduced to decrease a force input to a separation generating portion.

Problems to be Solved by the Invention

However, although the aforementioned methods employed by the prior art to address the problem are effective in reducing macro-strain around a wire chafer, these methods cannot attain a sufficient effect with respect to micro-strain in the vicinity of the wire chafer cords. In particular, no effective solution has been made with respect to a portion where a "nucleus of failure" appears.
Therefore, in order to make separation of a wire chafer in a bead portion less likely to occur and effectively enhance separation resistance of the bead portion, the structure of a wire chafer itself need be improved in addition to employing the conventional technique. In view of this, an object of the present invention is to provide a pneumatic tire which is capable of advantageously enhancing separation resistance properties of a bead portion, while retaining good anti-slip properties of a rim of the bead portion.

Means for Solving the Problems

In order to achieve the aforementioned object, a pneumatic tire according to the present invention including: a pair of bead portions; a bead core provided at each bead portion and having a polygonal configuration in cross section; a radial carcass extending in a toroidal shape from one bead portion to the other bead portion such that respective ends thereof are wound around the corresponding bead cores from the inner side to the outer side of the tire, to form a skeleton of the tire; at least one layer of wire chafer disposed on the outer side of the radial carcass with respect to the bead core; and a rubber chafer disposed in a contact area between the bead portion and a prescribed rim, wherein, in a cross section of the tire assembled with the prescribed rim, the angle formed by the bottom side of the bead core with respect to a bead seat of the prescribed rim is set in the range of $0\pm2°$, and a portion, on the tire outer surface side, of a spiral filament or an outermost layer filament of steel cords constituting the wire chafer extends at an angle in the range of $90\pm5°$ with respect to the extending direction of ply cords constituting the radial carcass.

In the present invention, a "prescribed rim" represents a rim prescribed by a standard according to the size of a tire, which standard is an industrial standard effective in an area where the tire is produced or used. Examples of such a standard as described above include "YEAR BOOK" by THE TIRE AND RIM ASSOCIATION, INC. in the United States, "STANDARDS MANUAL" by The European Tyre and Rim Technical Organisation in Europe and "JATMA YEAR BOOK" by The Japan Automobile Tyre Manufacturers Association, Inc. in Japan.

Further, in an embodiment of the present invention, it is preferable that the wire chafer of the pneumatic tire is provided so as to cover at least the entire region from a position corresponding to the outer end in the tire widthwise direction of the bead core to the right under the center of the bead core.

Yet further, in another embodiment of the present invention, it is preferable that the wire chafer of the pneumatic tire is constituted of plural sheets of a chafer member disposed in the tire circumferential direction in a divided manner.

Yet further, in yet another embodiment of the present invention, it is preferable that the bead core of the pneumatic tire is disposed such that, in a cross section of the tire assembled with the prescribed rim, the angle formed by the bottom side of the bead core with respect to a bead seat of the prescribed rim is set at 0°.

Yet further, in yet another embodiment of the present invention, it is preferable that a deformation absorbing rubber layer, having JIS A hardness which is smaller than the JIS A hardness of the rubber chafer and larger than the JIS A hardness of coating rubber of the wire chafer, is provided between the wire chafer and the rubber chafer.

Effect of the Invention

In the pneumatic tire according to the present invention, since there is employed a structure in which a portion, on the tire outer surface side, of a spiral filament or an outermost layer filament of steel cords constituting the wire chafer extends at an angle in the range of $90\pm5°$ with respect to the extending direction of ply cords constituting the radial carcass, the spiral filament or the outermost layer filament extends in a substantially orthogonal direction with respect to the extending direction of the ply cords, i.e. an input direction of horizontal shear force exerted on the coating rubber of the wire chafer. As a result, an area where the shear force is exerted is made relatively small and thus strain is dissipated, whereby separation resistance properties of the bead portion can be effectively enhanced.

Further, in the tire of the present invention, by employing a bead core structure having a polygonal sectional configuration in which the bottom side is linear and a structure in which the taper difference angle formed between the bead core and the bead seat is 0±2° together, occurrence of a peak in a contact pressure exerted by the bead base portion on the rim is suppressed, whereby strain which tends to concentrate at the pressure peak position in the conventional tires can be dissipated. Further, since the distribution of the contact pressure exerted on the rim is thus made relatively broad, the total contact pressure increases accordingly, whereby good anti-slip properties of rim is ensured. In a case where the taper difference angle exceeds the aforementioned range, the contact pressure on the rim will be "peaky".

In the pneumatic tire as described above, by disposing a wire chafer so as to cover at least the entire region from a position corresponding to the outer end in the tire widthwise direction of the bead core to the right under the center of the bead core, strain on each ply cord is reduced due to the insertion of the wire chafer, as compared with the case where the ply cords are directly covered by the rubber chafer. Further, constituting the wire chafer of plural sheets of a chafer member disposed in the tire circumferential direction in a divided manner is effective in terms of making the tire production easier and more stable with retaining good performances of the tire.

In the present invention, by employing a structure where, in a cross section of the tire assembled with the prescribed rim, the angle formed by the bottom side of the bead core with respect to a bead seat of the prescribed rim is set at 0°, the distribution of a contact pressure on the rim is free of a peak and thus concentration of strain is prevented.

Further, in a case of employing a structure where a deformation absorbing rubber layer, having JIS A hardness which is smaller than the JIS A hardness of the rubber chafer and larger than the JIS A hardness of coating rubber of the wire chafer, is provided between the wire chafer and the rubber chafer, there is obtained an effect of reducing shear force exerted by the rubber chafer.

EXPLANATION OF REFERENCES

Figure 1:
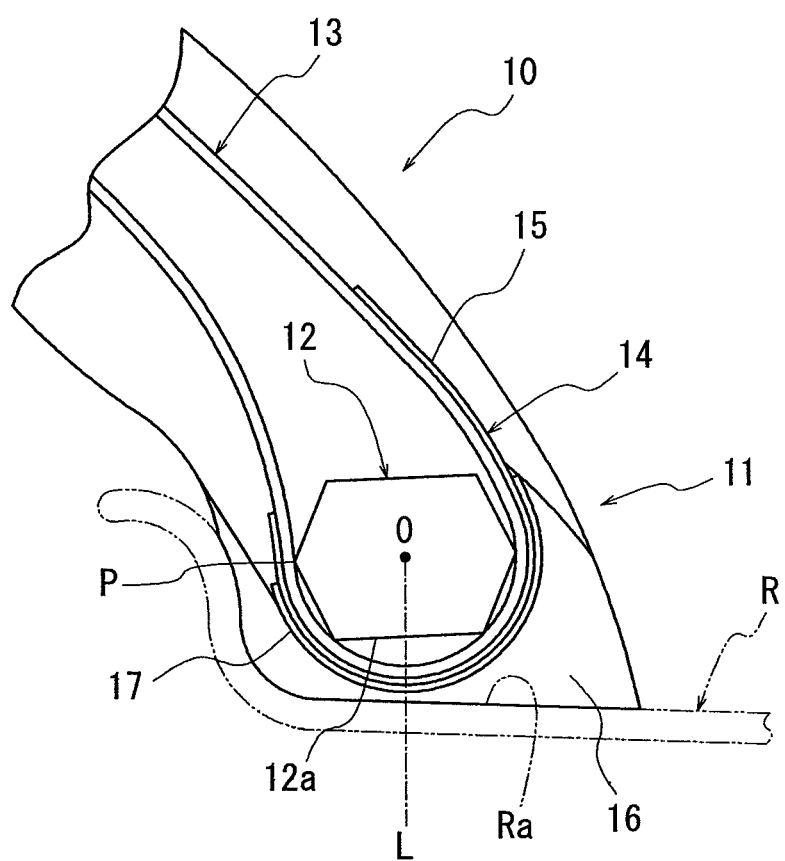
FIG. 1 is a cross sectional view showing a main part of a tire according to an embodiment of the present invention.

10 Pneumatic tire
11 Bead portion
12 Bead core
12a Bottom side
13 Radial carcass
14 Wire chafer
15 Steel cord
15a Spiral filament
15b Outermost layer filament
16 Rubber chafer
17 Deformation absorbing rubber layer
R Prescribed Rim
Ra Bead seat

BEST MODE FOR CARRYING OUT THE INVENTION

Hereinafter, the best mode for carrying out the present invention will be described with referring to the drawings.

FIG. 1 is a sectional view in the tire widthwise direction, in other words, a cross sectional view showing only one bead portion of a pneumatic tire of an embodiment of the present invention, in a state where the tire is assembled with a prescribed rim. As shown in FIG. 1, the pneumatic tire 10 includes a pair of bead portions 11 which is to be assembled with a prescribed rim R. The pneumatic tire 10 may be, for example, a pneumatic radial tire for heavy load mounted to a construction vehicle or the like of a relatively high output having, e.g. a load coefficient (K-FACTOR) prescribed in TRA (THE TIRE AND RIM ASSOCIATION INC.) of not less than 1.7. The prescribed rim R with which the tire is assembled may be a drop center rim having 5° to 8° taper.

In respective bead portions 11, respective bead cores 12 each having a polygonal contour or configuration in cross section and a flat bottom surface are provided in an embedded manner such that, in the tire-rim assembly as shown in FIG. 1, the bottom side 12a of each bead core 12 having a substantially hexagonal configuration in cross section is positioned with respect to a bead seat Ra of the prescribed rim R at an angle, as difference in taper therebetween, is in the range of 0±2°.

In the structure described above, the angle as difference in taper between the bottom side 12a of the bead core 12 and the bead seat Ra of the prescribed rim R may be set at 0°.

Further, between the respective bead portions, there is provided a radial carcass 13 constituted of at least one carcass ply extending in toroidal shape from one bead portion to the other bead portion such that respective ends thereof are wound around the corresponding bead cores 12 from the inner side to the outer side of the tire. Yet further, at each bead portion 11, at least one layer of wire chafer 14 (which will be referred to as "WCH" hereinafter) as a cord reinforcing layer made of steel cords is provided with respect to the bead core 12 on the outer side of the radial carcass 13 also made of steel ply cords such that the WCH is adjacent thereto.

The WCH 14 is preferably provided in a range covering at least the entire region from a position corresponding to the outer end P in the tire widthwise direction of the bead core 12 to the right under the center O of the bead core 12, i.e. the line OL extending in the radial direction. In the structure described above, the steel cords of the WCH 14 may be provided so as to extend to intersect the ply cords of the radial carcass 13 at an angle in the range of 0° to 90° when viewed from a side of the tire.

The WCH 14 may be constituted of either a single sheet of a chafer member or plural sheets of the chafer member disposed in a divided manner in the tire circumferential direction.

Figure 2:
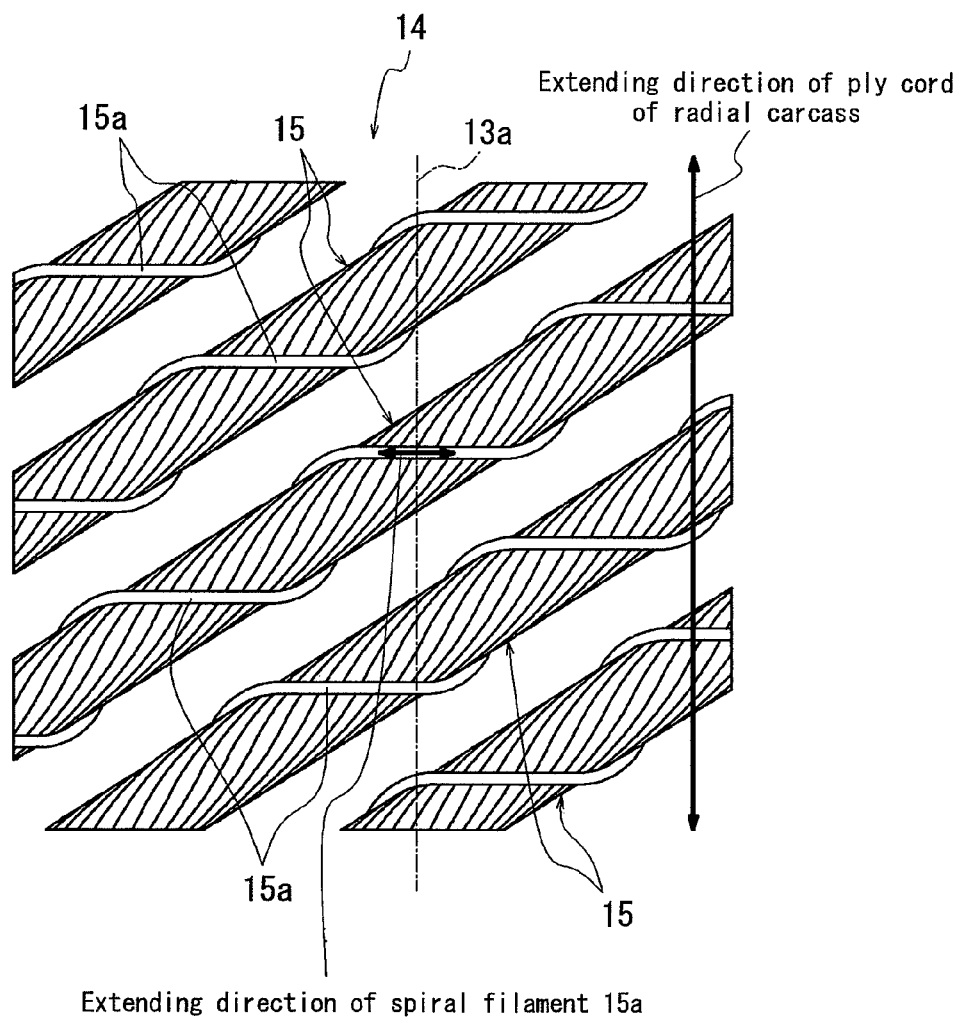
FIG. 2 is a partial explanatory view showing a wire chafer covering a radial carcass in a perspective manner from the outer surface of the tire.
Figure 3:
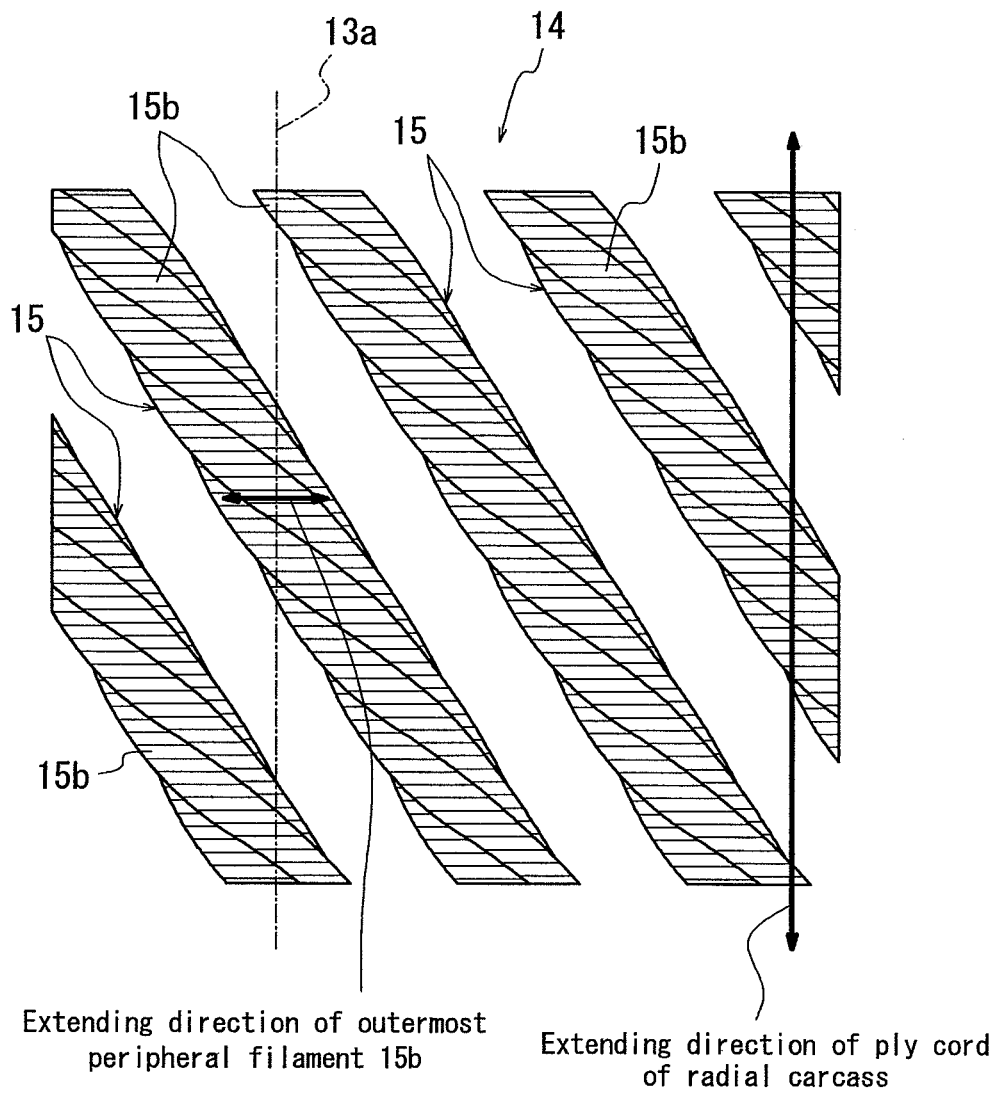
FIG. 3 is a view similar to FIG. 2, showing another wire chafer covering a radial carcass.

In the present embodiment, the steel cords constituting the WCH 14 has a twined structure and, specifically, may have a structure as shown in FIG. 2 in which a part of the wire chafer is enlarged or a structure as shown in FIG. 3. In each of the steel cords b 15 of the WCH 14 provided on the outer side of the radial carcass 13 to cover the radial carcass, the outermost peripheral portion thereof is, as shown in FIG. 2 and FIG. 3, formed by a spiral filament 15a or an outermost (peripheral) layer filament 15b.

Further, in the tire as shown in FIG. 2 in which a part of the WCH is exemplarily shown in a perspective manner from the outer surface side of the tire, a portion, on the tire outer surface side, of a spiral filament 15a of each steel cord 15 extends at an angle in the range of 90±5° with respect to the extending direction 13a of ply cords (the up-down direction in FIG. 2) constituting the radial carcass 13, such that the spiral filament 15a extends to substantially intersect the ply cords of the radial carcass 13.

Alternatively, each of the steel cords 15 of the WCH 14 may be structured such that, as shown in FIG. 3, a portion, on the tire outer surface side, of an outermost layer filament 15b thereof extends at an angle in the range of 90±5° with respect to the extending direction 13a of ply cords (the up-down direction in FIG. 3) of the radial carcass 13.

In either the structure shown in FIG. 2 or the structure shown in FIG. 3, the spiral filament or the outermost layer filament extends in a substantially orthogonal direction with respect to the extending direction of the ply cords, i.e. an input direction of shear force, as described above, whereby strain can be dissipated and the separation resistance properties of the bead portions can be efficiently enhanced.

The intersection angle of the spiral filament 15 or the outermost layer filament 15b of the steel cord 15 with respect to the ply cord is most preferably 90° in terms of decreasing an area where shear force is exerted. A sufficient strain dissipating effect by decreasing an area where shear force is exerted can still be obtained as long as the intersection angle remains within the range of 90±5°. However, in a case where the intersection angle is beyond the range of 90±5°, a failure nucleus having increased strain is generated.

Further, as shown in FIG. 1, a rubber chafer 16 is disposed in a contact area between the bead portion 11 and a prescribed rim R. The rubber hardness of the rubber chafer 16 is set, for example, in the range of 70 to 80 in JIS A hardness. Yet further, a deformation absorbing rubber layer 17 serving to absorb shear deformation by difference in rigidity caused by steps is provided between the rubber chafer 16 and the WCH 14.

In the present embodiment, the JIS A hardness of the deformation absorbing rubber layer 17 is set in the range of 65 to 70 such that the rubber hardness of the deformation absorbing rubber layer is smaller than that of the rubber chafer 16 and larger than that of the coating rubber of the WCH, which is, e.g. in the range of 60 to 65.

The deformation absorbing rubber layer 17 is preferably provided in a region from the outer end in the tire widthwise direction of the bead core to the right under the center O of the bead core.

As described above, the pneumatic tire 10 having the aforementioned structures can cause an action and an effect as follows.

1. By differentiating a taper angle in the range of 0±2° between the bottom side of the bead core and the bead seat of the prescribed rim, in a cross section, under a bead core structure having a polygonal cross sectional configuration and a flat bottom surface portion, occurrence of a peak in a contact pressure between the bottom portion of the bead core and the prescribed rim R can be suppressed, whereby strains, which tend to concentrate at a pressure peak position in the prior art, can be dissipated to suppress a separation trouble which would otherwise occur from the pressure peak position as the starting point.

2. Based on a discovery that a failure nucleus is generated at a spiral for an outermost layer filament of the steel cord 15 of the WCH 15 and that generation of a failure nucleus at such failure nucleus starting portions can be effectively deterred by reducing strain at the failure nucleus starting portions by dissipating the strain, the spiral filament 15a or the outermost layer filament 15b of each steel cord 15 of the WCH 14 is disposed, as shown in FIG. 2 and FIG. 3, to intersect (e.g. be orthogonal to) the extending direction of the cords of the radial carcass 13, i.e. the input direction of horizontal shear force exerted with respect to the coating rubber of the wire chafer, whereby an area where the shear force works is decreased and strain is dissipated accordingly.

3. By providing the wire chafer to cover at least the entire region from a position corresponding to the outer end in the tire widthwise direction of the bead core to the right under the center of the bead core, occurrence of a peak in a contact pressure and thus concentration of strain is prevented.

4. By constituting the wire chafer of plural sheets of a chafer member disposed in a divided manner in the tire circumferential direction, there is obtained an effect of reducing shear force exerted by the rubber chafer.

EXAMPLES

There were prepared a tire of Conventional Example, in which the extension direction of spiral filaments of the WCH steel cords was aligned in parallel with the extending direction of steel ply cords of a radial carcass, and a tire of Example of the present invention, in which the extension direction of spiral filaments of the WCH steel cords was set orthogonal to the extending direction of steel ply cords of a radial carcass, such that each of these tires had the size of ORR 59/80R63. Each of the tires was assembled with a 5° taper drop center rim prescribed by TRA, and each tire assembly was subjected to a test in which load applied to thereto was increased stepwise for every 24 hours under the condition of the internal pressure at which the tire was inflated being 600 kPa and the load applied to the tire being 100 to 160% of the maximum load capacity. An area where separation cracks occurred on the coating rubber of the wire chafer was measured to evaluate a developing rate of separation cracks in each tire assembly.

In the test described above, the developing rates of separation cracks in the bead heal portion when the respective tires were driven on a drum were compared with each other, whereby the results expressed by index values were obtained, as shown in Table 1.

The smaller index values represent the better results.

TABLE 1

|  | Conventional Tire | Example Tire |
| --- | --- | --- |
| Crack developing rate INDEX | 100 | 45 |

Regarding the INDEX value, the smaller values represent the better results.

As shown in Table 1, it is understood that the Example tire can significantly decrease the crack developing rate.

The invention claimed is:

1. A pneumatic tire comprising:
a pair of bead portions;
a bead core provided at each bead portion and having a polygonal configuration in cross section;
a radial carcass extending in a toroidal shape from one bead portion to the other bead portion such that respective ends thereof are wound around the corresponding bead cores from the inner side to the outer side of the tire;
at least one layer of wire chafer disposed on the outer side of the radial carcass with respect to the bead core; and
a rubber chafer disposed in a contact area between the bead portion and a prescribed rim,
wherein, in a cross section of the tire assembled with the prescribed rim, the angle formed by the bottom side of the bead core with respect to a bead seat of the prescribed rim is set in the range of 0±2°,
the wire chafer is constituted of twined steel cords and coating rubber provided thereon, each of the steel cords has an outermost peripheral layer filament constituting an outermost peripheral layer of the steel cord, and a portion, on the tire outer surface side, of the outermost peripheral layer filament extends at an angle in the range of 90±5° with respect to the extending direction of ply cords constituting the radial carcass, such that the portion of the outermost layer filament extends to substantially intersect the ply cords of the radial carcass.

2. The pneumatic tire of claim 1, wherein the wire chafer is provided so as to cover at least the entire region from a position corresponding to the outer end in the tire widthwise direction of the bead core to the right under the center of the bead core.

3. The pneumatic tire of claim 1, wherein the wire chafer is divided into plural sheets of a chafer member extending continuously in the tire circumferential direction.

4. The pneumatic tire of claim 1, wherein, in a cross section of the tire assembled with the prescribed rim, the angle formed by the bottom side of the bead core with respect to a bead seat of the prescribed rim is set at 0°.

5. The pneumatic tire of claim 1, wherein a deformation absorbing rubber layer, having JIS A hardness which is smaller than the JIS A hardness of the rubber chafer and larger than the JIS A hardness of coating rubber of the wire chafer, is provided between the wire chafer and the rubber chafer.

* * * * *